United States Patent [19]

Homberg et al.

[11] E Re. 29,428

[45] Reissued Oct. 4, 1977

[54] REGENERATION OF ALKANOLAMINE ABSORBING SOLUTION IN GAS SWEETENING PROCESSES

[75] Inventors: Otto A. Homberg, Easton; Charles W. Sheldrake, Bethlehem; Alan H. Singleton, Baden, all of Pa.

[73] Assignee: Bethlehem Steel Corporation, Bethlehem, Pa.

[21] Appl. No.: 630,566

[22] Filed: Nov. 10, 1975

Related U.S. Patent Documents

Reissue of:

[64] Patent No.: 3,864,449
Issued: Feb. 4, 1975
Appl. No.: 361,389
Filed: May 17, 1973

[51] Int. Cl.[2] ..... B01D 53/34

[52] U.S. Cl. ..... 423/228; 423/229; 423/236; 423/238

[58] Field of Search ..... 423/226–229, 423/236, 238

[56] References Cited

U.S. PATENT DOCUMENTS

| | | | |
|---|---|---|---|
| 2,161,663 | 6/1939 | Baehr et al. | 423/228 |
| 2,701,750 | 2/1955 | Paulsen et al. | 423/229 |
| 2,797,188 | 6/1957 | Taylor, Jr. et al. | 423/228 |

*Primary Examiner*—Earl C. Thomas
*Attorney, Agent, or Firm*—Joseph J. O'Keefe; Charles A. Wilkinson

[57] ABSTRACT

A catalytic amount of ammonia or ammonium compounds are utilized to prevent deterioration of alkanolamines employed in gas sweetening processes. The ammonia is added either to the sour gas or the absorbing solution and acts to suppress thiocyanate [formation] *accumulation* during absorption.

20 Claims, 3 Drawing Figures

REGENERATION OF ALKANOLAMINE ABSORBING SOLUTION IN GAS SWEETENING PROCESSES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to gas purification and more particularly to gas purification by the removal of acid gases from industrial gas in an absorption/desorption process.

2. Prior Art

The term "gas sweetening" pertains to gas purification processes in which acid gases, particularly sulfurous gases are removed from industrial gases.

Gas sweetening processes commonly utilize aqueous absorbing solutions into which the acid gases are scrubbed (absorbed) to be later stripped (desorbed) for possible further treatment. Desorbing is accomplished by heating the spent solution to expel the acid gases. The process steps generally include concurrent reutilization of the absorbing solution.

Examples of the industrial gases which are sweetened by absorption/desorption processes include coke oven gases, producer gas, natural gas and synthesis gas. The described process is also applicable to synthetic natural gas and the products of coal gasification.

The absorbing solution, which is normally alkaline, is often an alkanolamine such as monoethanolamine.

The acid gas contaminants removed from the industrial gases include such gases as hydrogen cyanide, and sulfurous gases such as sulfur dioxide, hydrogen sulfide and mercaptans.

In the absorption of acid gases containing both sulfurous compounds and hydrogen cyanide by alkanolamines it has been found that, due to the formation of thermally stable amine thiocyanates such as monoethanolamine thiocyanate from the alkanolamine and the acid gases, the alkanolamine solution gradually becomes "poisoned" or less efficient.

Proposed prior art solutions for avoiding the regeneration problems engendered by the presence of thermally stable thiocyanates in spent alkanolamine absorbing solutions are known, but have failed to be practical. One proposal, disclosed in U.S. Pat. No. 2,137,602, for example, is merely an expedient in which two stage washing is utilized to conserve absorbent. The first scrubbing solution is discarded after use, the industrial gas is rescrubbed and only the second wash solution is regenerated. U.S. Pat. No. 2,399,142 proposes to solve the problem of [theemally] *thermally* stable, non-decomposable intermediates by stripping the spent absorbent under pressure to force decomposition. This, however, is a costly procedure in large scale operations. A third proposal, disclosed in U.S. Pat. No. Re. [18,959] *18,958,* preferentially substitutes aliphatic and cyclo paraffin amines such as hexylamine for the lower boiling mono and diethanolamine in order to try to achieve a more easily decomposible intermediate.

None of the prior art proposals have succeeded in providing a truly successful means of regenerating spent alkanolamine absorbing solutions.

SUMMARY OF THE INVENTION

We have discovered a method of regenerating spent alkanolamine absorbing solutions utilized in acid gas absorption/desorption processes which overcomes the aforementioned prior art problems.

Briefly, the method of this invention provides a catalytic amount of ammonia in ionizable form for use in the alkanolamine absorbent during acid gas absorption. The ammonia may be, for example, in the form of ammonia ($NH_3$) itself, aqueous ammonium solutions, or an ammonium salt of a weak acid. The manner in which the ammonia is provided to the absorbing process may vary in that the ammonia may be combined with the sour gas, i.e. the acid gas contaminated industrial gas, or the ammonia may be combined with the absorbing solution prior to the absorbing process. During the subsequent desorbing step spent absorbent now becomes readily regenerable. Thermally stable thiocyanates no longer remain in the absorbent and the regenerated absorbent may be continually recycled to the stripper and reused. *The presence of a catalytic amount of ammonia in ionizable form thus acts as a deterrent with respect to thermally stable thiocyanates remaining in the absorbent.*

While we do not wish to be restricted to a theory of how our process works, we postulate that the presence of a catalytic amount of ammonia in the absorbing step causes the formation of thiourea from thiocyanates present in the solution according to the equation:

$$NH_4^{(+)} + CNS^{(-)} \rightarrow (NH_2)_2CS \quad (1)$$

Thiourea is thermally unstable due to its reaction with water in the basic media according to the equation:

$$(NH_2)_2CS + 2\,H_2O \rightarrow 2\,NH_3 + CO_2 + H_2S \quad (2)$$

The reaction of equation (2) will regenerate the ammonia catalyst, and generate carbon dioxide and hydrogen sulfide which can exit from the system as part of the foul gas stream. *The accumulation of thermally stable alkanolamine thiocyanates in the absorbing solution is thus prevented and the absorbing solution does not become poisoned.*

It is therefore a primary object of this invention to provide an easily regenerable alkanolamine absorbing solution for use in industrial gas sweetening processes.

It is another object of this invention to solve the long standing problem of spent alkanolamine absorbent regeneration by a method of simplicity and economy.

These and other objects will be readily apparent to one skilled in the art from a consideration of the accompanying drawings, description and detailed exemplary embodiments.

DETAILED DESCRIPTION

The following terms employed hereinafter are defined as follows. Sour gas refers to an industrial gas in combination with its acid gas contaminants. The sour gas, when the acid gases are removed, becomes the sweet gas. By foul gas is meant the acid gas contaminants which are removed from the sour gas.

For the practice of our invention a first general description will be given, followed by *a* detailed descriptions and alternate embodiments, and thirdly a specific example will be disclosed wherein coke oven gas is desulfurized with monoethanolamine according to the method of this invention.

Figure 1:
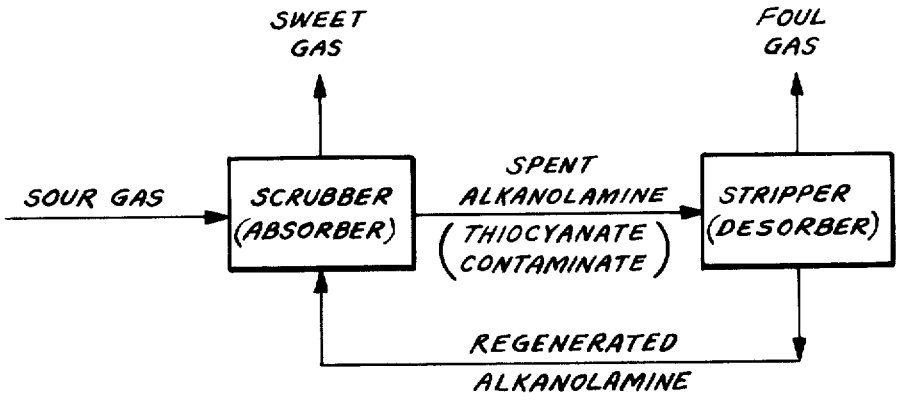
FIG. 1 is a flow diagram of the basic method of this invention.

Referring now to the block diagram in FIG. 1, for a first general description, a sour gas enters a scrubber, known also as an absorber, where acid gas contaminants are absorbed into the alkanolamine solution in a manner [as] described, for example, in The Gas Conditioning Fact Book, Chapter 3, Dow Chemical Co., 1962[,] and other references well known in the art. Additionally, by a chemical reaction of acid gases with the absorbing solution and ammonia, thiourea is postulated also to be formed. The sour gas, its contaminants now absorbed, leaves the scrubber as a sweet gas. The spent absorber solution, which we believe now contains thiourea as well as absorbed acid gases, is sent to a stripper (desorber) in which the absorbing solution is regenerated by heating and any thiourea therein is converted to carbon dioxide and hydrogen sulfide which leave the system with other desorbed gases, and also to ammonia which remains in solution. The latter is preferably recycled back to the desorber and/or the absorber with alkanolamine absorbing solutions.

Figure 2:
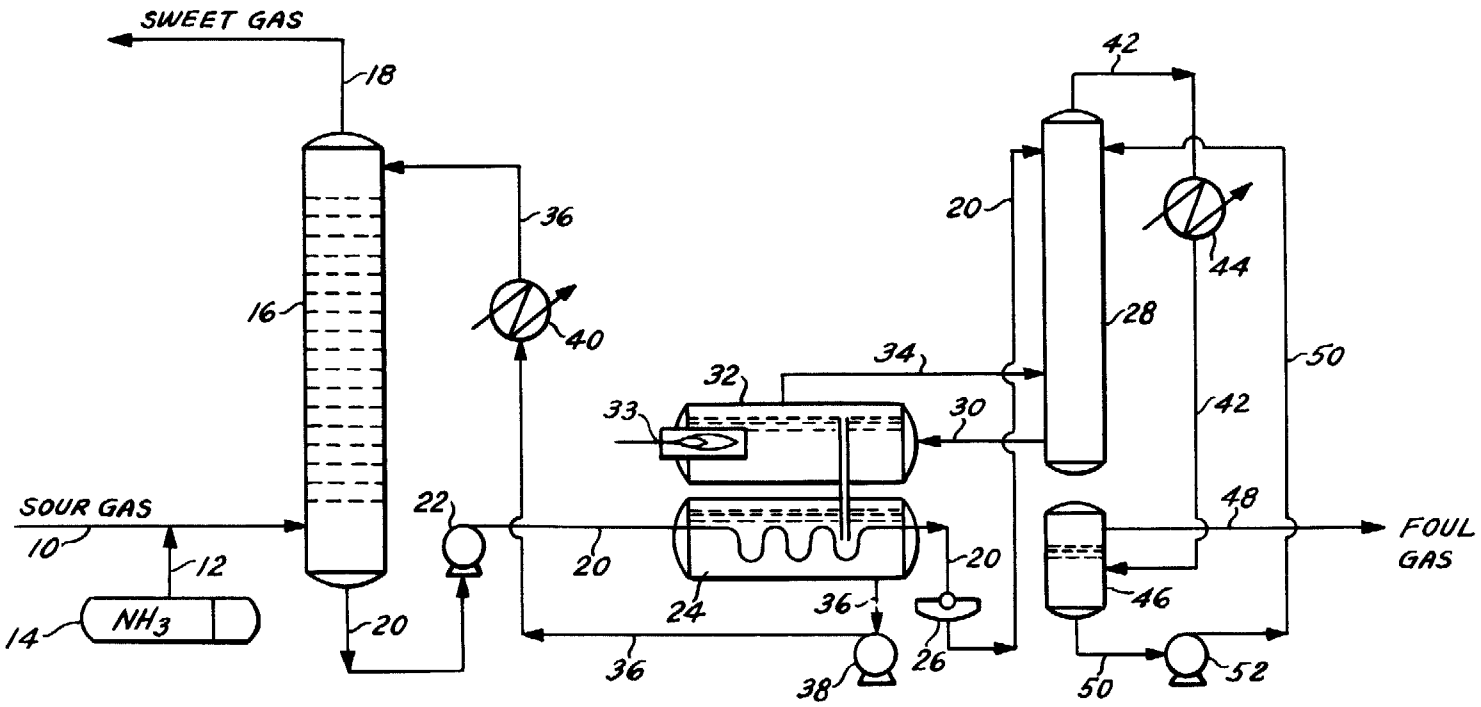
FIG. 2 is a schematic representation of the steps of a preferred embodiment in the process of this invention.

In a more detailed manner of practicing our process and, referring now to FIG. 2, a sour industrial gas, entering an absorber 16 through line 10 is combined with ammonia which enters the gas stream at line 12 from ammonia reservoir 14. The combined sour gas and ammonia enter scrubber 16 from line 12. The industrial gas emerges from scrubber 16 through line 18 as sweet gas. An alkanolamine scrubbing or absorbing solution enters scrubber 16 near the top from line 36. Spent alkanolamine absorbing solution, leaves absorber 16 by line 20 and is pumped by pump 22 to still-feed preheater 24. Still-feed preheater 24 is a reservoir which receives regenerated absorbing solution, described more fully hereinafter, and also by heat exchange, acts to simultaneously heat spent absorbent and cool regenerated absorbent. Thus, spent absorbent in line 20 is heated while passing through still-feed preheater 24. Leaving still-feed preheater 24, the spent absorbent passes through filter 26 and from there travels to stripper (desorber) 28. Stripper 28 is operated in conjunction with reboiler 32, and desorbed solution (containing the ammonia catalyst) travels from stripper 28 by line 30 to reboiler 32, where the solution is heated, and vapors returned to stripper 28 by line 34. A flame 33 or other suitable heating means serves to heat reboiler 32. Overflow from reboiler 32 flows into still-feed preheater 24, where it is cooled by absorbent in line 20, and leaves still-feed preheater 24 by line 36, through pump 38 to cooler 40 and from there is returned as regenerated absorbent to scrubber 16.

Stripper 28 and reboiler 32 together regenerate the absorbent by desorbing acid gases from the solution and also by hydrolyzing any thiourea present in the solution with the water component of the solution according to the equation:

$$(NH_2)_2CS + H_2O \rightarrow 2\,NH_3 + CO_2 + H_2S \qquad (2)$$

The foul gases, including carbon dioxide and hydrogen sulfide postulated to be generated from equation (2) together with accompanying absorbent vapor, leave stripper 28 by line 42, pass through cooler 44, and enter accumulator 46. Foul gas emerges from the system via accumulator 46 through line 48, while condensed vapors containing the regenerated ammonia catalyst in accumulator 46 are pumped in line 50 through pump 52 back to stripper 28.

Figure 3:
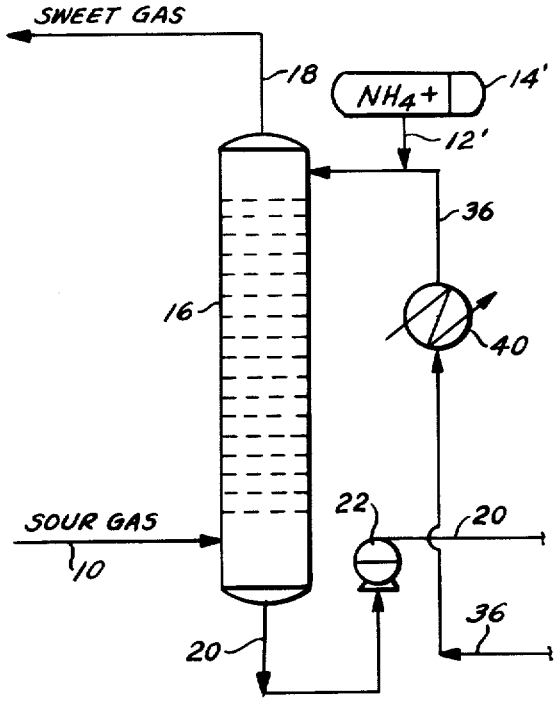
FIG. 3 illustrates an alternate embodiment of this invention showing a portion of the process shown in FIG. 2.

An alternate embodiment wherein an ammonia solution is utilized in an absorption/desorption process is shown in part in FIG. 3. The sour industrial gas as in FIG. 2 enters scrubber 16 from line 10 where contaminants are removed by absorption to cause the industrial gas to emerge as a sweet gas at 18. Likewise, as in FIG. 2, spent alkanolamine is removed by line 20, and is pumped by pump 22 to be regenerated as previously described and shown in FIG. 2. Also as in FIG. 2, regenerated or fresh alkanolamine enters scrubber 16 from line 36, but in FIG. 3 the catalyst in the form of $NH_4^+$ derived from an ionizable ammonia compound to be more fully disclosed hereinafter, enters scrubber 16 through line 36 from reservoir 14' by way of line 12'.

In both of the above examples shown in FIGS. 2 and 3 regenerated ammonia is preferably returned to the absorber 16 with the regenerated alkanolamine through line 36 and it is only additional make-up ammonia or ammonium ions which enter the gas stream of the absorbent stream from reservoir 14. It will readily be understood, however, that if no ammonia were to be recycled with the solution the reservoir 14 would have to supply all of the catalytic ammonia necessary for the operation of the invention above and beyond any ammonia which might be naturally contained in the initial foul gas stream.

A detailed example of the use of our method, in which coke oven gas is desulfurized with monoethanolamine and in which ammonia ($NH_3$) is utilized, is described as follows: Referring again to FIG. 2, coke oven gas of approximate analysis of:

| Component | Analysis |
|---|---|
| $H_2$ | 53.0% (by volume) |
| $CH_4$ | 28.5% (by volume) |
| $CO_2$ | 2.0% (by volume) |
| CO | 6.2% (by volume) |
| Higher Hydrocarbons ($C_2$–$C_6$) | 4.7% (by volume) |
| $H_2S$ | 0.6% (by volume) |
| HCN | 0.1% (by volume) |
| $H_2O$ | 0.4% (by volume) |
| $N_2$ | 4.2% (by volume) |
| Argon | 0.1% (by volume) |

enters at line 10 at a temperature of from about 50°–100° F., in a volume of 10–38 thousand cubic feet per hour (Mcfh) and at a pressure of 7–9 pounds per square inch (psi.). Ammonia from reservoir 14 is added through line 12 at a rate such as to comprise about 0.2 percent by volume (which in gases is also the mole percent) of the total gas composition.

The sweet gas emerges from the scrubber at line 18 at 9.36 Mcfh, 75°–110° F., and 1–6 psi, with a composition which analyzes about:

| Component | Analysis |
|---|---|
| $H_2$ | 54.0% (by volume) |
| $CH_4$ | 29.1% (by volume) |
| $CO_2$ | 0.8% (by volume) |
| CO | 6.3% (by volume) |
| Higher Hydrocarbons ($C_2$–$C_6$) | 4.8% (by volume) |
| $H_2S$ | 0.0% (by volume) |
| HCN | 0.0% (by volume) |

-continued

| Component | Analysis |
|---|---|
| $H_2O$ | 0.6% (by volume) |
| $N_2$ | 4.3% (by volume) |
| Argon | 0.1% (by volume) |
| $NH_3z$ | 0.0% (by volume) |

The spent alkanolamine removed from the absorber at 20 has a temperature of about 80°-130° F. and analyzes:

| Component | Analysis |
|---|---|
| MEA (monoethanolamine) | 11.5% (by weight) |
| $H_2S$ | 0.7% (by weight) |
| $CO_2$ | 4.3% (by weight) |
| HCN | 0.1% (by weight) |
| $NH_3$ | 0.2% (by weight) |
| $H_2O$ | balance |

After passing through still-feed preheater 24 the solution temperature of the spent MEA prior to entering stripper 28 is now about 130°-150° F. The solution emerging from the stripper 28 at line 30 now analyzes:

| Component | Analysis |
|---|---|
| MEA | 13.0% (by weight) |
| $H_2S$ | 0.2% (by weight) |
| $CO_2$ | 3.7% (by weight) |
| HCN | trace (by weight) |
| $NH_3$ | 0.2% (by weight) |
| $H_2O$ | balance |

enters reboiler 32 at about 220°-250° F. and also leaves the reboiler at 220°-250° F. (the nature of a reboiler is such that it is essentially in thermal equilibrium with an incoming stream). A typical operational pressure of reboiler 32 is 1-6 psi. Regenerated stripping solution in line 36 enters cooler 40 at about 140°-170° F. and emerges at about 75°-110° F. A flow rate of about 2-6 gallons per minute (gpm) is maintained.

Meantime the foul gas leaving accumulator 46 in line 48 is between 100°-140° F., 110-160 psi. and emerges at 200-800 cubic feet per hour (cfh). The foul gas analysis is now about:

| Component | Analysis |
|---|---|
| $H_2S$ | 32.5% (by volume) |
| $CO_2$ | 64.0% (by volume) |
| HCN | 3.5% (by volume) |

Condensed vapor from accumulator 46 in line 50 returns to stripper 28 at 100°-140° F., at a rate of up to 1 gallon per minute (gpm) and analyzes about:

| Component | Analysis |
|---|---|
| MEA | 0.7% (by weight) |
| $H_2S$ | 0.8% (by weight) |
| $CO_2$ | 1.1% (by weight) |
| HCN | 0.0% (by weight) |
| $NH_3$ | 1.1% (by weight) |
| $H_2O$ | Balance |

Many variations are contemplated within the scope of this invention.

The form in which the ammonia may be utilized is not restricted to ammonia itself. Any ammonium compound which is soluble in the absorbent solution and will provide $NH_4^+$ ions is acceptable so long as the accompanying anion has no deleterious effects on the chemistry of the desired reactions. Suitable ammonia or ammonium compositions include aqueous ammonia, i.e. ammonium hydroxide, or ammonium salts of weak acids such as ammonium carbonate or ammonium bicarbonate. Further, should the sour gas contain ammonia, the addition of ammonia may be eliminated and the necessary ammonia supplied in situ. For example, many coke oven gas streams contain ammonia. It has, however, been customary to remove the ammonia because it is objectionable and can be readily removed by contact with acid sulfate compounds or the like. In such case, therefore, in order to practice the present invention, one must either refrain from removing all the ammonia and leave sufficient ammonia to effect regeneration of the alkanolamine solution, or, alternately, enough ammonia must be added back to the system to provide the requisite ammonia.

The concentration of ammonia required by the method of this invention is not known to be critical, but rather depends on the acid gas composition. We have used between 0.2 to 1 weight percent ammonia in the absorber solution for coke oven gas sweetening, but this amount may vary with other industrial gas composition. The minimum amount needed is readily ascertainable where a particular acid gas concentration is known by referring to the equation chemistry given herein for the formation *of* thiourea.

Utilizing excess ammonia over that required by the equation chemistry is acceptable. The solubility of ammonia in the absorbent at the absorbent temperature is the controlling factor at the upper level for ammonia concentration and excess amounts of ammonia will simply be expelled from the hot solution. Gas sweetening by acid gas absorption/desorption is widely practiced today in large scale industrial gas producing operations and the present improvement in such processes can be readily adopted to existing facilities.

While our preferred absorbent is monoethanolamine, other alkanolamines such as diethanolamine, triethanolamine, and alkyl or aryl substituted ethanolamines also fall within the scope of this invention.

There is no particular restriction on the sweet gas constituent composition of an industrial gas suitable for sweetening by our process. Producer gas, natural gas, synthetic natural gas, as well as coke oven gas, are appropriate gases.

Our invention is useful, however only where both hydrogen cyanide and a sulfide gas are present, or alternatively, any deficiency is supplied to balance the chemistry of equation (1).

Our process is not limited by the various pieces of apparatus shown, but rather the apparatus indicated is meant to be illustrative only. Modifications of the process scheme to suit the type of industrial gas and composition of absorbing solution are well within the skill of the art to ascertain.

It is now possible, utilizing the invention thus described to sweeten industrial gases with simplicity and economy. Our process does not require the design of new equipment and is suited to large scale processes. No costly reagents are required and, by using our regeneration process, the benefits of alkanolamine absorption/desorption processes may now be more fully realized.

We claim:

1. In combination with an aqueous alkanolamine absorption/desorption process wherein industrial gases are sweetened by removal of acid gases including hydrogen cyanide and sulfide gases, a process for preventing irreversible deterioration of the alkanolamine solution comprising:

maintaining sufficient ammonium ions in the alkanolamine solution during absorption to insure a continued presence of said ammonium ions in the alkanolamine solution during the absorption process, said ammonium acting as a deterrent with respect to the [formation] *accumulation* of thiocyanates whereby irreversible deterioration of said alkanolamine solution by said thiocyanates is suppressed.

2. The process of claim 1 in which the industrial gas is coke oven gas.

3. The process of claim 1 in which the ionizable form of ammonia supplied is substantially ammonia.

4. The process of claim 1 in which the ionizable form of ammonia is substantially an aqueous solution of an ammonium salt of a weak acid.

5. The process of claim 2 in which the ionizable form of ammonia supplied is substantially ammonia.

6. The process of claim 2 in which the ionizable form of ammonia is substantially an aqueous solution of an ammonium salt of a weak acid.

7. The process of claim 2 in which the ionizable form of ammonia is ammonia in an amount of at least about 0.2 mole percent of the industrial gas.

8. The process of claim 2 in which the ionizable form of ammonia is an aqueous solution of an ammonium salt of a weak acid in the amount of about 0.2 to 1 weight percent of the absorbing solution.

9. The process of claim 7 in which the alkanolamine is substantially monoethanolamine.

10. The process of claim 8 in which the alkanolamine is substantially monoethanolamine.

11. The process of claim 1 in which at least part of the ionizable ammonia is supplied by recirculating desorbed solution.

12. An improved gas sweetening process for removing said gases from industrial gases containing hydrogen cyanide and sulfide components by means of aqueous alkanolamine absorbing solutions without irreversible deterioration of the absorption capacity of the alkanolamine solution due to combination of the alkanolamine with thiocyanates comprising:

a. absorbing the acid gases into the alkanolamine solution in the presence of ammonium ions, b. desorbing the acid gases from the alkanolamine to regenerate the solution and recirculating the regenerated and undeteriorated alkanolamine solution back to the absorbing step.

13. An improved method of gas sweetening according to claim 12 wherein ammonium ions are maintained in both the absorption and desorption steps of the gas sweetening process.

14. An improved method of gas sweetening according to claim 13 additionally comprising:

c. recovering ammonia from the foul gases leaving the desorption step of (b) and recycling said ammonia to the absorption step of (a).

15. An improved method of gas sweetening according to claim 13 wherein the ammonia is recycled to the absorption step of (a) along with the recirculated alkanolamine solution from the desorption step of (b).

16. An improved method of gas sweetening according to claim 12 wherein the ammonia is provided in excess of the molar amount which would theoretically be necessary to form thiourea from thiocyanates.

17. An improved method of gas sweetening according to claim 16 in which solution of the elevated temperature in the desorption step is sufficient to decompose thiourea if present, to gaseous carbon dioxide and hydrogen sulfide.

18. In combination with an [alkaholamine] *alkanolamine* absorption/desorption process wherein industrial gases are sweetened by removal of acid gases including hydrogen cyanide and sulfide gases, a process for preventing irreversible deterioration of the alkanolamine solution comprising:

a. providing prior to the absorbing process, an aqueous alkanolamine containing solution for the absorption of acid gases therein;

b. providing ammonia in ionizable form;

c. absorbing acid gases into said alkanolamine solution in the presence of said ammonia whereby thiourea is formed;

d. desorbing said solution including reacting said thiorurea with water to generate gaseous carbon dioxide and hydrogen sulfide and removing desorbed gases to purify said solution.

*19. In combination with an aqueous alkanolamine absorption/desorption process wherein industrial gases are sweetened by removal of acid gases including hydrogen cyanide and sulfide gases, a process for preventing irreversible deterioration of the alkanolamine solution comprising:*

*maintaining sufficient ammonium ions in the alkanolamine solution during absorption to insure a continued presence of said ammonium ions in the alkanolamine solution during the absorption process, said ammonium acting as a deterrent with respect to thiocyanates remaining in the absorbent whereby irreversible deterioration of said alkanolamine solution by said thiocyanates is suppressed.*

*20. In combination with an aqueous alkanolamine absorption/desorption process wherein industrial gases are sweetened by removal of acid gases including hydrogen cyanide and sulfide gases, a process for preventing irreversible deterioration of the alkanolamine solution comprising:*

*maintaining sufficient ammonium ions in the alkanolamine solution during absorption to insure a continued presence of said ammonium ions in the alkanolamine solution during the absorption process, said ammonium acting as a deterrent with respect to the formation of thermally stable alkanolammonium thiocyanate salts whereby irreversible deterioration of said alkanolamine solution by said alkanolammonium thiocyanates is suppressed.*

* * * * *